UNITED STATES PATENT OFFICE.

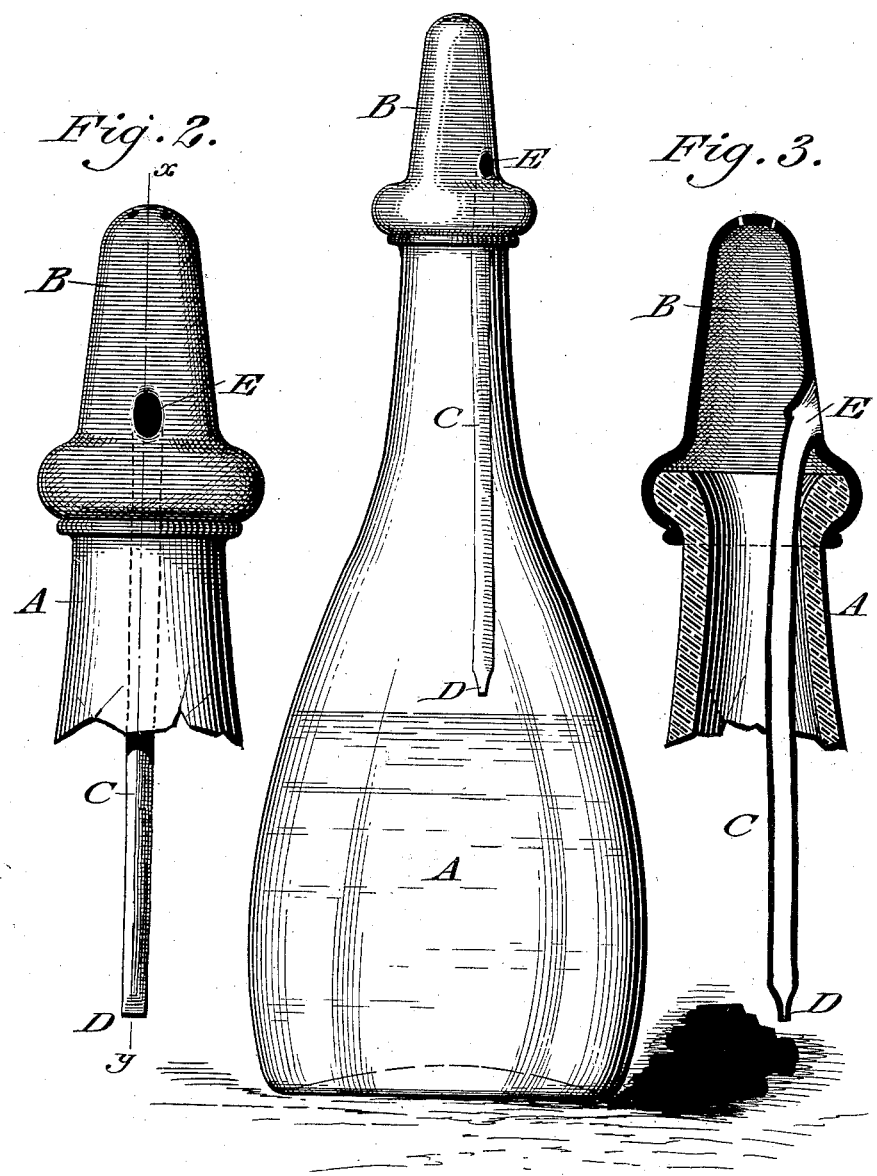

WALTER F. WARE, OF CAMDEN, NEW JERSEY.

NURSING-BOTTLE.

SPECIFICATION forming part of Letters Patent No. 380,835, dated April 10, 1888.

Application filed April 14, 1887. Serial No. 234,833. (No model.)

*To all whom it may concern:*

Be it known that I, WALTER F. WARE, a citizen of the United States, and a resident of Camden, New Jersey, have invented an Improvement in Nursing-Bottles; and I do hereby declare the following to be a full, clear, and exact description of the same, reference being had to the annexed drawings, making part hereof.

The nature of my invention will fully appear from the following specification and claims.

In the drawings, Figure 1 is a perspective view of a nursing-bottle with nipple detached; Fig. 2, a broken elevation showing the nipple with the air-tube in its side; Fig. 3, a vertical sectional view on line X Y of Fig. 2; Fig. 4, a perspective view of part of the air-tube, showing the flattened end.

A is the bottle; B, the nipple, made of soft rubber; C, the air-tube in the side of the nipple; D, the flattened lower end of the air-tube to permit the entrance of air into the bottle as the contents of the latter are drawn out; E, a recess in the side of the nipple, below which the air-tube hangs downward in nearly a perpendicular line into the bottle.

The nipple is made in one piece with the air-tube, and the end D is flattened before the rubber is vulcanized, leaving a narrow flat opening for the ingress of air, which opening is, however, too close to permit the escape of the milk within the bottle. This flattened tip D acts as a valve, permitting a flow in only one direction.

The recess E permits the tube C to hang almost straight down. (See Fig. 3.) I form the tube C on the outside of the nipple in manufacturing them, and after the vulcanizing is complete I turn the nipple inside out to the form shown in the drawings, so that the tube hangs down inside. The soft nipple is clasped over the mouth of the bottle in the usual way.

What I claim as new is—

1. A soft sucking-nipple, B, provided with sucking-holes and adapted to be clasped over the vent of a nursing-bottle, A, also provided with inlet air-tube C, opening through the side of the nipple, dependent from the interior surface thereof, and provided with a valve, substantially as and for the purposes described.

2. A soft sucking-nipple, B, adapted to be clasped over the vent of a nursing-bottle, A, and provided with an elongated inlet air-tube, C, opening through the side of the nipple, the latter having soft flattened sides near its end to close the tube against the exit of the contents of the bottle through the tube, but still to allow air to enter the bottle as the contents of the bottle are diminished, substantially as described.

WALTER F. WARE.

Witnesses:
  JAMES M. CASSADY,
  WM. H. CARSON.